United States Patent
Schmitz et al.

(10) Patent No.: US 10,914,504 B2
(45) Date of Patent: Feb. 9, 2021

(54) DEVICE AND METHOD FOR ICING PREVENTION REGULATION FOR HEAT PUMP EVAPORATORS

(71) Applicants: Halla Visteon Climate Control Corporation, Daejeon-si (KR); Audi AG, Ingolstadt (DE)

(72) Inventors: Engelbert Schmitz, Bergheim (DE); Peter Heyl, Cologne (DE); Marc Graaf, Krefeld (DE); Christian Rebinger, Ingolstadt (DE); Dirk Schroeder, Manching (DE)

(73) Assignees: Audi AG, Ingolstadt (DE); Halla Visteon Climate Control Corporation, Daejeon-Si (KR)

( * ) Notice: Subject to any disclaimer, the term of this patent is extended or adjusted under 35 U.S.C. 154(b) by 651 days.

(21) Appl. No.: 14/383,590

(22) PCT Filed: Mar. 8, 2013

(86) PCT No.: PCT/EP2013/054679
§ 371 (c)(1),
(2) Date: Sep. 8, 2014

(87) PCT Pub. No.: WO2013/132046
PCT Pub. Date: Sep. 12, 2013

(65) Prior Publication Data
US 2015/0107278 A1   Apr. 23, 2015

(30) Foreign Application Priority Data

Mar. 9, 2012  (DE) .................. 10 2012 102 041

(51) Int. Cl.
*F25D 21/04* (2006.01)
*F25B 47/00* (2006.01)
(Continued)

(52) U.S. Cl.
CPC ......... *F25D 21/04* (2013.01); *B60H 1/00785* (2013.01); *B60H 1/00828* (2013.01);
(Continued)

(58) Field of Classification Search
CPC ........ F25D 21/04; F25B 49/02; F25B 47/006; B60H 1/00828; B60H 1/00785
See application file for complete search history.

(56) References Cited

U.S. PATENT DOCUMENTS 4,180,986 A * 1/1980 Shaw .................. F04C 28/06
                                               418/84
4,298,056 A * 11/1981 Nelson .................. F25B 30/02
                                               165/238
(Continued)

FOREIGN PATENT DOCUMENTS

DE    10-2011-051285        12/2012
DE      102011051285 A1 * 12/2012 ............. B60H 1/321
(Continued)

OTHER PUBLICATIONS

PCT International Preliminary Report on Patentability in PCT/EP2013/054679, dated Sep. 9, 2014, 8 pages.
(Continued)

*Primary Examiner* — Kun Kai Ma
(74) *Attorney, Agent, or Firm* — Servilla Whitney LLC

(57) ABSTRACT

The invention relates to a device and a method for icing prevention regulation for a heat pump evaporator (3) in air conditioning systems of vehicles, composed of a subsection (1) of a refrigerant circuit which can be operated both as a heat pump and also as an air conditioning system. The device comprises the heat pump evaporator (3), an electrical or mechanical refrigerant compressor (4), a cooler fan (9) which is attached to the heat pump evaporator (3) and which draws ambient air (11) upstream from and through the heat (Continued)

pump evaporator (3) at an adjustable flow speed, and which thus permits a permanent flow of ambient air (11) over the heat pump evaporator surface, a first temperature sensor (6) in or on the refrigerant line (5, 5a) upstream from the heat pump evaporator (3) with respect to the heat pump operating direction, and a control and regulating unit (8). The control and regulating unit (8) is connected via signal lines (10, 10a, 10b, 10c, 10e) at least to the first temperature sensor (6), to further sensors, in particular for detecting the ambient air temperature (Tu) and the vehicle speed ($V_F$), to the expansion valve (2), to the cooler fan (9) and to the refrigerant compressor (4) for the direct or indirect regulation of the flow cross section of the expansion valve (2) and the rotational speed of the electric refrigerant compressor (4) or of the regulating valve of the mechanical refrigerant compressor (4) and for the actuation of the cooler fan (9) of the vehicle during heat pump operation.

8 Claims, 6 Drawing Sheets

(51) Int. Cl.
B60H 1/00 (2006.01)
F24H 4/00 (2006.01)
F24D 19/00 (2006.01)
F25B 49/02 (2006.01)

(52) U.S. Cl.
CPC .......... F24D 19/0095 (2013.01); F24H 4/00 (2013.01); F25B 47/006 (2013.01); F25B 49/02 (2013.01); B60H 2001/00961 (2019.05)

(56) References Cited

U.S. PATENT DOCUMENTS

| | | | | |
|---|---|---|---|---|
| 4,677,830 A * | 7/1987 | Sumikawa | ........... | B60H 1/3225 62/126 |
| 4,790,144 A * | 12/1988 | Yokouchi | ........... | F25B 49/02 62/156 |
| 4,879,879 A * | 11/1989 | Marsala | ........... | F25B 21/04 236/68 B |
| 5,065,593 A | 11/1991 | Dudley et al. | | |
| 5,186,014 A * | 2/1993 | Runk | ........... | F25B 49/005 62/129 |
| 5,187,944 A | 2/1993 | Jarosch | | |
| 5,425,246 A * | 6/1995 | Bessler | ........... | F25B 41/062 62/211 |
| 5,493,870 A * | 2/1996 | Kodama | ........... | B60H 1/00907 62/155 |
| 5,647,222 A * | 7/1997 | Sarakinis | ........... | B60H 1/3225 62/126 |
| 5,992,163 A | 11/1999 | Baruschke et al. | | |
| 6,138,464 A * | 10/2000 | Derosier | ........... | F25D 21/006 62/155 |
| 6,189,325 B1 * | 2/2001 | Pittion | ........... | B60H 1/3207 165/230 |
| 6,330,802 B1 * | 12/2001 | Cummings | ........... | B60H 1/00978 62/126 |
| 6,571,566 B1 * | 6/2003 | Temple | ........... | F25B 49/005 62/127 |
| 6,644,052 B1 * | 11/2003 | Wightman | ........... | F25B 41/04 62/196.4 |
| 6,666,042 B1 * | 12/2003 | Cline | ........... | F25D 17/02 62/175 |
| 7,895,850 B2 * | 3/2011 | Kitsch | ........... | F25B 13/00 62/150 |
| 8,290,722 B2 * | 10/2012 | Schuster | ........... | F25B 49/005 340/612 |
| 2003/0140644 A1 * | 7/2003 | Wightman | ........... | F25B 41/04 62/196.4 |
| 2006/0288716 A1 | 12/2006 | Knight et al. | | |
| 2007/0068181 A1 * | 3/2007 | Kim | ........... | F25B 49/022 62/228.1 |
| 2007/0220908 A1 * | 9/2007 | Takahashi | ........... | B60H 1/00764 62/133 |
| 2008/0295532 A1 * | 12/2008 | Sawada | ........... | F25B 49/02 62/228.3 |
| 2009/0241566 A1 * | 10/2009 | Bush | ........... | F25B 9/008 62/115 |
| 2009/0249802 A1 * | 10/2009 | Nemesh | ........... | B60H 1/00278 62/56 |
| 2009/0277196 A1 | 11/2009 | Gambiana et al. | | |
| 2010/0089076 A1 * | 4/2010 | Schuster | ........... | F25B 49/005 62/77 |
| 2011/0100031 A1 * | 5/2011 | Barsanti | ........... | F25B 9/006 62/81 |
| 2012/0101673 A1 * | 4/2012 | Caddick | ........... | B60H 1/004 701/22 |
| 2013/0061619 A1 * | 3/2013 | Saitou | ........... | F24F 11/77 62/89 |
| 2013/0091882 A1 * | 4/2013 | Cho | ........... | F25B 13/00 62/156 |
| 2013/0291572 A1 * | 11/2013 | Geerts | ........... | B01D 53/265 62/89 |
| 2014/0150477 A1 * | 6/2014 | Qu | ........... | F25D 21/006 62/80 |
| 2014/0290288 A1 * | 10/2014 | Burns | ........... | F25B 49/02 62/115 |

FOREIGN PATENT DOCUMENTS

| | | |
|---|---|---|
| EP | 2236383 A2 | 10/2010 |
| JP | 07098167 A * | 4/1995 |
| JP | 2002130876 A | 5/2002 |
| WO | WO-99/61135 | 12/1999 |
| WO | WO-2009/094691 | 8/2009 |

OTHER PUBLICATIONS

PCT International Search Report in PCT/EP2013/054679, dated Jul. 18, 2013, 3 pages.

* cited by examiner

DEVICE AND METHOD FOR ICING PREVENTION REGULATION FOR HEAT PUMP EVAPORATORS

CROSS-REFERENCE TO RELATED APPLICATIONS

This application is the National Phase entry of International Application No. PCT/EP/2013/054679, filed Mar. 8, 2013, which claims priority to German Application No. 10 2012 102 041.8, filed Mar. 9, 2012, both of which are incorporated herein by reference in their entireties.

TECHNICAL FIELD

The invention relates to a device and a method for icing prevention regulation for heat pump evaporators in air conditioning systems of vehicles.

The invention resides in the field of heat pumps having ambient air as a heat source. The use of heat pumps with ambient air as a source for heating the passenger interior has been studied by several institutes, vehicle manufacturers and suppliers. When operating heat pumps with ambient air source at refrigerant temperatures, in particular at or below 0° C., there is the risk of icing on the air side of the heat pump evaporator.

BACKGROUND

The icing of the evaporator is a physical process, which is influenced essentially by the following factors:
 the surface temperature of the evaporator;
 the dew point of the air flowing over the evaporator, and
 the flow speed of the air conducted over the evaporator.

When cooling moist air, either air moisture is condensed, which forms ice crystals at temperatures below 0° C., which coalesce to form a layer of ice. Air moisture may also desublimate and form a layer of frost. If the evaporator continues to be operated under these conditions, the ice/frost layer will grow and reduce the flow cross-section of the evaporator on the air side. At the same time, the heat transfer resistance between air and evaporator surface is increased. With the fan operating at the same output, this results in a reduced flow speed of the air conducted over the evaporator due to the higher pressure drops, which promotes the formation of frost. Eventually, the evaporator will accrete frost or ice. The system can no longer be operated if the evaporator is frozen: The suction pressure would continue to drop. Consequently, as a further disadvantage, additional expenditure of heat energy is required in order to de-ice the evaporator.

Icing of the evaporator is prevented in the prior art by not operating the heat pump at ambient air temperatures below 0° C., in the case of the Toyota Prius plug-in hybrid design, even at +5° C. To de-ice the heat pump evaporator, the refrigerant circuit is switched over and operated in air conditioning mode (AC-mode). In this case, the heat pump evaporator assumes the function of the condenser and is perfused with a hot refrigerant. In the process, ice which has accumulated on the outside of the heat pump evaporator is melted, and the frozen heat pump evaporator operated as a condenser is actively de-iced. The disadvantage of this variant is that during the active de-icing phase not only is the heat pump function unavailable, but in addition, the air supplied to the interior via the evaporator is further cooled in the air conditioning system. This increases the deficit in the heating output even more. This disadvantage can only be alleviated by increasing the complexity of the refrigerant circuit interconnections.

A further disadvantage is that in the phase of the frozen AC condenser upstream from the engine radiator, the air flow and, therefore, the engine cooling are only insufficiently ensured.

A method for operating a heat pump at low ambient air temperatures for a heating circuit is described in the publication WO 2009/094691 A1, in which a heat pump described therein comprises an evaporator, a compressor, a condenser, an expansion valve, which is situated between the outlet of the condenser and the inlet of the evaporator. The evaporator, the compressor, the condenser, the expansion valve and, in turn, the evaporator are connected to one another by lines. The refrigerant liquid in the evaporator absorbs the heat from the ambient air and evaporates. The compressor compresses the refrigerant vapor using mechanical energy and thereby increases the pressure and temperature. The refrigerant condenses in the condenser and heats the medium of the heating circuit.

In the expansion valve, the pressure and the temperature of the refrigerant liquid are reduced by opening the valve. The refrigerant liquid then flows back into the evaporator. There, the air flowing through the evaporator is cooled and the two-phase refrigerant is evaporated.

Attached to the evaporator is a fan connected to a control unit which, in turn, is in signal connection with the compressor and a temperature sensor. The heat pump includes a refrigerant flow through the evaporator, which may be regularly or temporarily interrupted by the control unit. During normal operation, the fan draws ambient air over one side of the evaporator, as a result of which the ambient air is conducted over the evaporator surface, whereby refrigerant vapor is produced as a result of heat absorbed from the ambient air. In the event of icing of the evaporator, in which the very low temperatures in the icing region are indicated by the temperature sensor, the refrigerant is stopped in the compressor by the control unit. The evaporator is then reversed from the side in the direction of the air striking the surface of the evaporator, so that warmer air is conducted onto the evaporator surface and the evaporator is de-iced.

One disadvantage is that in the event of icing, the refrigerant flow must be interrupted and a greater expenditure of electrical energy is required for de-icing. Moreover, electric vehicles do not have warm air. During the de-icing phase, the heat pump is unavailable. A redundant heating system must then be designed.

A method and a system for controlling refrigerant pressure in an air conditioning system are described in the publication US 2006/0288716 A, the system being comprised of a compressor, a condenser and an evaporator, which are arranged in a closed refrigerant circuit. The condenser is subdivided into at least two valve-controlled units. In the event of potential icing, at least one unit of the condenser is switched off. High pressure in the evaporator is released with the aid of an additional valve, thereby increasing the pressure level in the evaporator and lowering the risk of icing.

Also known from the prior art is a regulation for preventing icing by regulating the outlet temperature level of the refrigerant exiting the heat pump evaporator. When using the refrigerant R134a (1,1,1,2-tetrafluoroethane) or refrigerants with similar property data such as, for example, R1234yf (2,3,3,3-tetrafluoropropene), there is a greater amplification factor between the pressure loss in the heat pump evaporator and the surface temperature of the evaporator (temperature glide in the evaporator caused by the pressure loss) than when using the refrigerant R744 ($CO_2$). If the expansion valve is opened too wide, the pressure drop in the heat pump evaporator increases and the surface temperature of the heat pump evaporator will drop locally in the region in which the refrigerant exits the evaporator. To prevent this from leading to local icing, the cross-section of the expansion valve is closed by a regulator if the measured saturation temperature of the refrigerant is too low, but at the same time no superheating is detected. In this case, the refrigerant mass flow must also be reduced. In an electric compressor, this is occurs through the reduction of the rotational speed of the compressor. This is accomplished in an externally regulated mechanical reciprocal compressor by actuating a regulator valve in such a way that the compressor stroke is reduced. Regulating the exit temperature level, in particular, when using the R134a and R1234yf refrigerants, may cause a refrigerant temperature above the ambient air temperature to occur at the entrance to the heat pump evaporator, due to the pressure drops in the heat pump evaporator. This results in heat dissipating to the surrounding environment or to a reduction in the surface used for heat absorption, and thus to reduced efficiency of the heat pump.

SUMMARY

The object of the invention is to provide a device and a method for icing prevention regulation, in which the heat pump function is continuously maintained with improved efficiency as compared to the prior art, even when ambient air temperatures below 0° C. are reached.

The object of the invention is achieved in part by a device for icing prevention regulation for heat pump evaporators in air conditioning systems of vehicles, composed of a subsection of a refrigerant circuit operable both as a heat pump as well as an air conditioning system, which includes an air conditioning system operating direction and a heat pump operating direction, the flow direction of which on the refrigerant side may be identical or opposing, comprising
  the heat pump evaporator which functions during air conditioning system operation in the air conditioning system operating direction as an air conditioning system condenser,
  a preferably externally regulatable expansion valve for opening and closing,
  an electric or a mechanical refrigerant compressor,
  refrigerant lines between expansion valve and heat pump evaporator and between heat pump evaporator and refrigerant compressor,
  a cooler fan attached to the heat pump evaporator, which draws ambient air upstream from and through the heat pump evaporator at an adjustable flow speed, and thereby permits a permanent flow of ambient air over the heat pump evaporator surface,
  a first temperature sensor in or on the refrigerant line upstream from the heat pump evaporator with respect to the heat pump operating direction, by means of which the saturation pressure of the refrigerant upstream from the evaporator may be ascertained, and
  a control and regulating unit, which is connected via signal lines at least to
    the first temperature sensor,
    additional sensors, measurement signal emitters or processing units with calculated values, in particular for detecting the ambient air temperature $T_U$ and the vehicle speed $V_F$,
    optionally present sensors such as, for example, a sensor for determining ambient moisture, a rain sensor, which detects rain or snowfall, and to other optional sensors,
    the expansion valve,
    the cooler fan, and
    the refrigerant compressor when using an electric refrigerant compressor or to the regulating valve of a mechanical refrigerant compressor,
  and which includes programmable means
    for evaluating and processing measurement signals of the sensors connected via the signal lines to the control and regulating unit,
    for directly or indirectly regulating the flow cross-section of the expansion valve and the rotational speed of the electric refrigerant compressor or the regulating valve of the mechanical refrigerant compressor, and
    for actuating the cooler fan of the vehicle during heat pump operation.

According to the inventive concept, this device makes it possible to adjust the surface temperature level or the refrigerant temperature in the entire heat pump evaporator to a predefined temperature level.

According to one embodiment of the invention, to regulate the exit temperature $T_{out}$, a pressure sensor connected to the control and regulating unit via another signal line is provided at an arbitrary position, with or without interconnected components, in the refrigerant line downstream from the exit of the heat pump evaporator on the path to the refrigerant compressor, with respect to the heat pump operating direction. For this purpose, a second sensor connected to the control and regulating unit via another signal line is preferably provided in the refrigerant line downstream from the exit of the heat pump evaporator on the path to the refrigerant compressor, with respect to the heat pump operating direction.

Alternatively, in place of the two individual sensors, a combined pressure-temperature sensor is used, which is also connected to the control and regulating unit via another signal line, and is placed at an arbitrary position with or without interconnected components, in the refrigerant line downstream from the exit of the heat pump evaporator on the path to the refrigerant compressor, again with respect to the heat pump operating direction.

In one embodiment of the device according to the invention, potential pressure drops, in particular by components which are placed between the exit of the heat pump evaporator and the sensor position for determining the temperature $T_{out}$, are stored per characteristics map in the control and regulating unit.

In addition, a non-active heat exchanger, i.e., one not perfused with refrigerant, for example, a chiller, connected in the refrigerant circuit in the device, may also be provided with a sensor, the sensor being designed to generate a pressure signal, which may be used to detect measurement values when regulating the exit temperature $T_{out}$.

In a particularly advantageous embodiment of the invention, a pressure drop characteristics map for the heat pump evaporator is stored in the control and regulating unit. With the aid of the ambient temperature $T_U$ and this pressure drop characteristic map, it is possible to estimate the maximum possible rotational speed of the compressor when using an electric refrigerant compressor, or the maximum possible control current of the regulating valve when using a mechanical refrigerant compressor. In this case, the (combined) pressure and temperature sensors downstream from the heat pump evaporator could even be eliminated.

The object of the invention is achieved in part by a method for icing prevention regulation for heat pump evaporators in air conditioning systems of vehicles, in which a heating of the vehicle interior is carried out with the aid of a heat pump having a heat pump evaporator, which uses ambient air as a source for evaporating a liquid refrigerant. In addition to the heat pump evaporator, the heat pump includes at least one refrigerant compressor, one condenser, and one expansion valve connected to the heat pump evaporator. These components are connected to one another in the indicated sequence by a refrigerant line which supports a refrigerant circuit. According to the invention, the surface temperature level of the heat pump evaporator and the flow speed of the ambient air are regulated as a function of the ambient air temperature upstream from the heat pump evaporator in the following method steps:

a) detection of the ambient air temperature or the air inlet temperature in the heat pump evaporator with the aid of an ambient temperature sensor or a temperature sensor in the air flow upstream from the heat pump evaporator;
b) detection of the inlet temperature of the refrigerant with the aid of a first temperature sensor, which is disposed in or on the refrigerant line upstream from the heat pump evaporator with respect to the flow direction of the refrigerant during heat pump operation,
c) transmission of the detected measurement signals of the sensors to a control and regulating unit, which evaluates the detected measurement signals;
d) adjustment of the flow speed of the ambient air and of the temperature level of the evaporator surface with the aid of the actuators: opening cross-section of the expansion valves, refrigerant mass flow in the refrigerant line and rotational speed of a cooler fan, wherein
   i. the flow cross-section of the expansion valve is directly or indirectly regulated by the control and regulating unit by closing the opening cross-section of the expansion valve far enough that the refrigerant temperature $T_{in}$ at the inlet into the heat pump evaporator, at a difference $\Delta T_{in}$ of between 0 to 5 K, preferably 0 to 2 K, is slightly below the detected ambient air temperature $T_U$ and/or the air inlet temperature into the heat pump evaporator, and wherein
   ii. the outlet temperature $T_{out}$ of the refrigerant exiting the heat pump evaporator, which is largely determined by the pressure drop and, therefore, by the mass flow of the refrigerant, is regulated by adjusting the outlet pressure from the heat pump evaporator via the compressor rotational speed of the refrigerant compressor or, when using a regulating valve for the refrigerant compressor, via the control current, so that saturation temperature of the refrigerant associated with outlet pressure, which is ascertained with the aid of characteristic curves, polynomial functions stored in the control and regulating unit, or by access to libraries with detailed property data functions, exhibits a difference $\Delta T_{max}$ relative to the ambient air temperature of 2 K to 10 K, preferably 2 to 5 K.

The difference $\Delta T_{out}$ between ambient air temperature $T_U$ and the outlet temperature $T_{out}$ is calculated based on the sum of the difference $\Delta T_{max}$ relative to ambient air temperature $T_U$ and the superheating of the refrigerant. Preferably, as the ambient air temperature continues to drop below 0° C., the temperature difference (refrigerant temperature–ambient air temperature) is shifted in the direction of the maximum value 10 K, preferably 5 K.

The following advantages may be achieved with the device according to the invention and with the method according to the invention:
- a minimization of the risk of icing,
- the prevention of a power loss of the heat pump during de-icing,
- a higher achievable power consumption from the source ambient air, and
- an efficient operation of a (auxiliary) heating system, a reduction of fuel consumption and an increase in the range of electric vehicles.

According to the invention, the expansion valve, as previously mentioned, is used to regulate the inlet temperature of the refrigerant in the heat pump evaporator. In the process, the valve is closed far enough that the refrigerant temperature $T_{in}$ at the inlet of the heat pump evaporator lies lightly below the ambient air temperature, or below the air inlet temperature into the heat pump evaporator. If the expansion valve is opened too far, the inlet temperature of the refrigerant rises above the ambient air temperature due to the pressure drop in the heat pump evaporator. In this case, a portion of the heat exchange surface is utilized not for evaporation, but if necessary even for condensing of the refrigerant. Instead of absorbing heat, heat is dissipated. As a result, the efficiency of the air heat pump is negatively impacted. Preferably, the valve is closed far enough that the refrigerant temperature $T_{in}$ at the inlet of the heat pump evaporator, at a difference of $\Delta T_{in}=1$ K, lies below the ambient air temperature $T_U$ and/or below the air inlet temperature into the heat pump evaporator.

According to one preferred embodiment of the method according to the invention, the outlet temperature $T_{out}$ of the refrigerant is regulated by storing a pressure drop characteristics map for the heat pump evaporator of the heat pump in the control and regulating unit, and by estimating with the aid of the ambient air temperature a maximum possible compressor rotational speed of the refrigerant compressor or, when using a regulating valve, the maximum possible regulating current.

Unlike pure AC operation, the cooler fan of the vehicle is also prompted at temperatures below 0° C. ambient air temperature by the air conditioning system/heat pump, preferably as a function of the travelling speed $v_F$ and/or by a rain and/or moisture sensor signal.

Additional details, features and advantages of the invention are set forth in the following description of exemplary embodiments with reference to the associated drawings, in which

DETAILED DESCRIPTION

Figure 1:
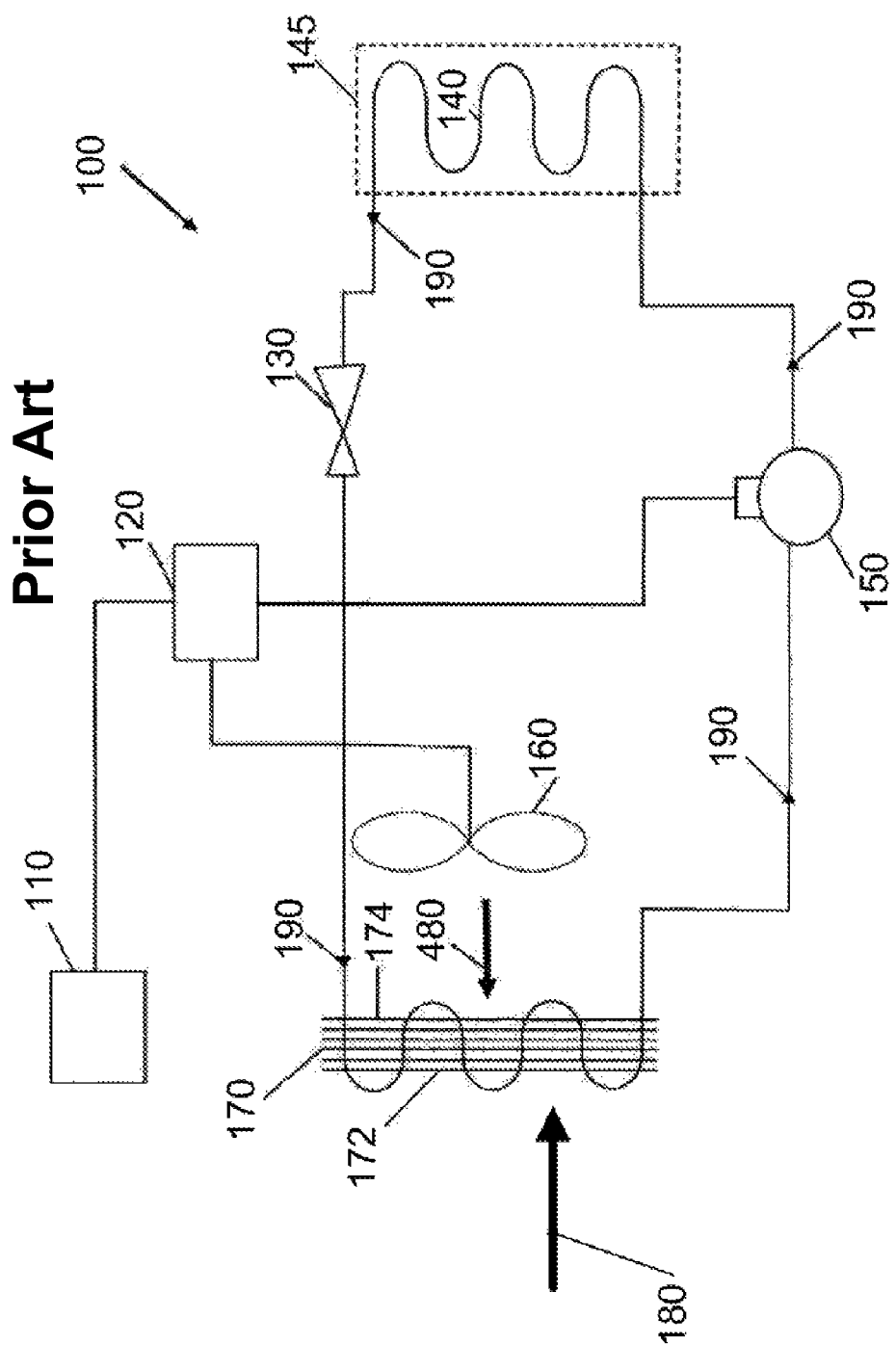
FIG. 1 shows a refrigerant circuit of a heat pump according to the prior art.

A prior art heat pump 100 from WO 2009/094691 A1 depicted in FIG. 1 comprises a refrigerant circuit having a heat pump evaporator 170, a compressor 150, a condenser 140 and an expansion valve 130, which is situated between the outlet of the condenser 140 and the inlet of the heat pump evaporator 170. The connection between the heat pump evaporator 170, the compressor 150, the condenser 140, the expansion valve 130 and, in turn, the heat pump evaporator 170 are provided by refrigerant lines 190 for the refrigerant flow. In the heat pump evaporator 170, the refrigerant liquid absorbs the heat from the ambient air 180 and evaporates to form refrigerant vapor. The compressor 150 compresses the refrigerant vapor using mechanical energy and increases temperature of the refrigerant vapor as a result. In the condenser 140, the refrigerant vapor transfers its heat to the heating circuit 145, the refrigerant vapor condenses and once again becomes refrigerant liquid. In the expansion valve 130, the pressure of the refrigerant liquid is reduced by opening the expansion valve 130 and the refrigerant liquid again passes to the heat pump evaporator 170, in which refrigerant vapor again forms as a result of absorption from the heat of the ambient air 180, and thus, the circulatory function is repeated. Attached to the heat pump evaporator 170 is a fan 160, which is connected to a control unit 120 which, in turn, is in signal connection with the compressor 150 and a temperature sensor 110. The heat pump 100 includes a refrigerant flow through the heat pump evaporator 170, which may be regularly or temporarily interrupted by the control unit 120. During normal operation, the fan 160 draws ambient air 180 over one side 172 of the heat pump evaporator 170, as a result of which the ambient air 180 is conducted over the heat pump evaporator surface, and refrigerant vapor is produced through absorption of heat from the ambient air 180. In the case of an icing of the heat pump evaporator 170, the very low temperatures in the icing region being indicated by the temperature sensor 110, the refrigerant flow in the compressor 150 is stopped by the control unit 120. Subsequently, the air direction of the fan 160 is reversed by the control unit 120, i.e., with the aid of the fan 160, the direction 480 of the air flow is diverted from the side 174 to the evaporator surface, such that warmer air is conducted onto the evaporator surface and the heat pump evaporator 170 is de-iced.

Figure 2:
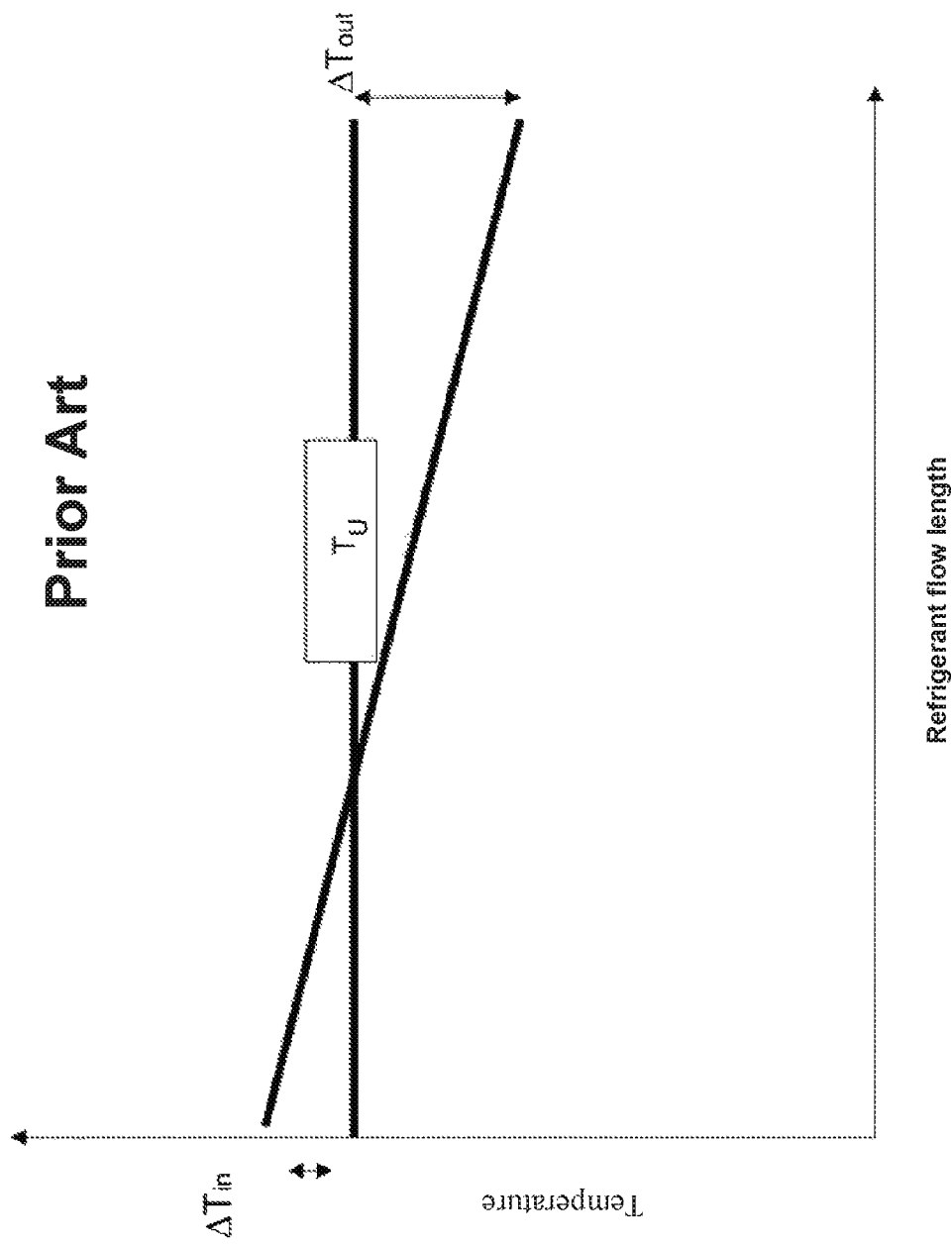
FIG. 2 shows a diagram with the temperature curve of the refrigerant over the flow length from the inlet to the outlet of a heat pump evaporator compared with the ambient air temperature $T_U$ due to pressure drops, prior art.

FIG. 2 illustrates the disadvantages of the prior art with reference to a diagram. The diagram depicts the temperature curve of the refrigerant over the flow length from the inlet to the outlet of a heat pump evaporator as compared to the ambient air temperature $T_U$ based on the pressure drops, with an inlet temperature $T_{in}$ and an outlet temperature $T_{out}$. Because of the pressure drops in the heat pump evaporator, regulating the outlet temperature level, in particular when using the refrigerants R134a and R1234yf, may cause a refrigerant temperature $T_{in}$ to occur having a temperature difference of $\Delta T_{in}$ above the ambient air temperature $T_U$, as shown in FIG. 2. This results in heat dissipating into the environment or in a reduction in the surface utilized for heat absorption, and thus to reduced efficiency of the heat pump.

Figure 3A:
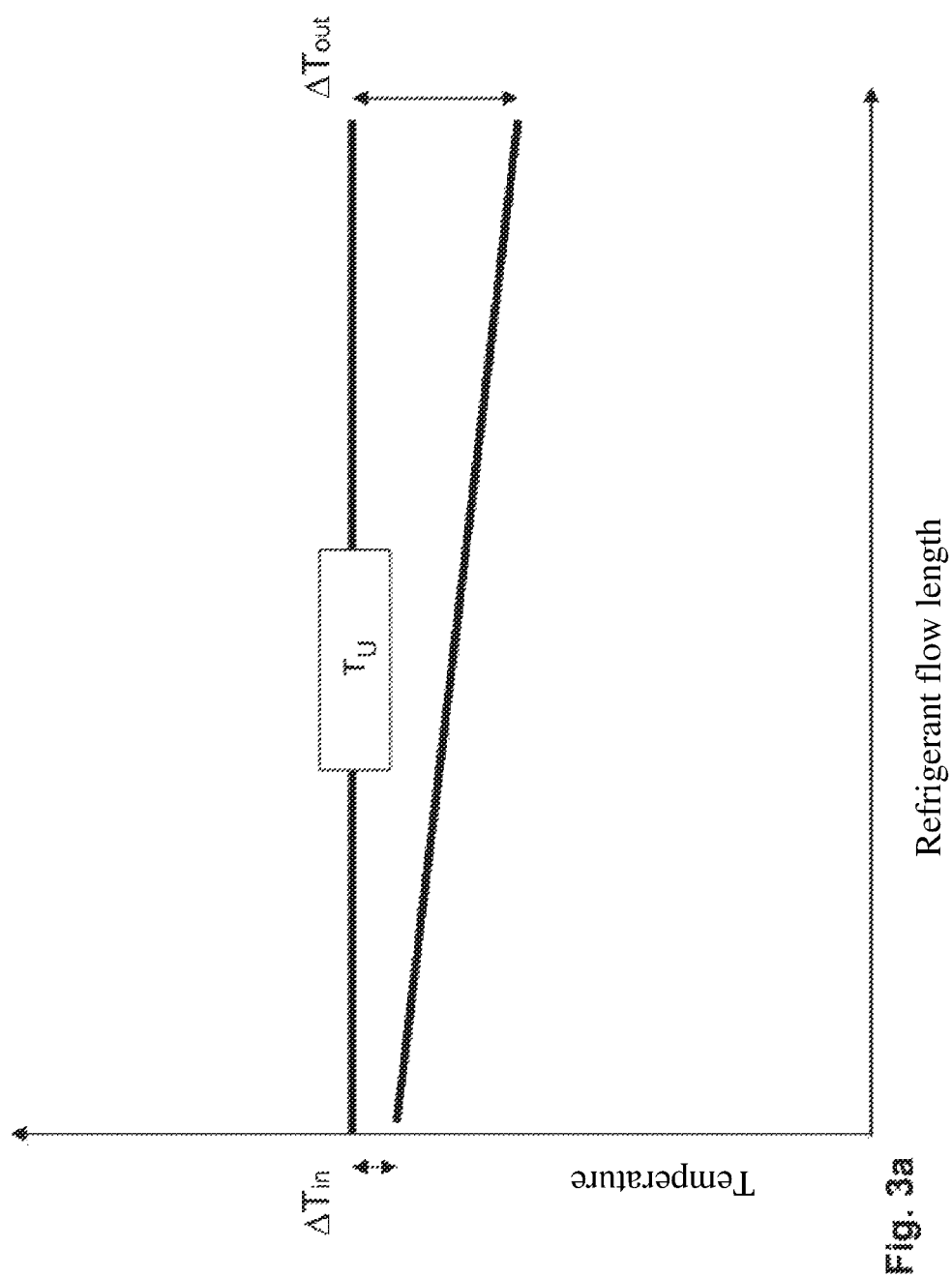
FIG. 3a shows a diagram with the temperature curve of the refrigerant over the flow length from the inlet to the outlet of the heat pump evaporator with refrigerant temperatures below the ambient air temperature $T_U$.
Figure 3B:
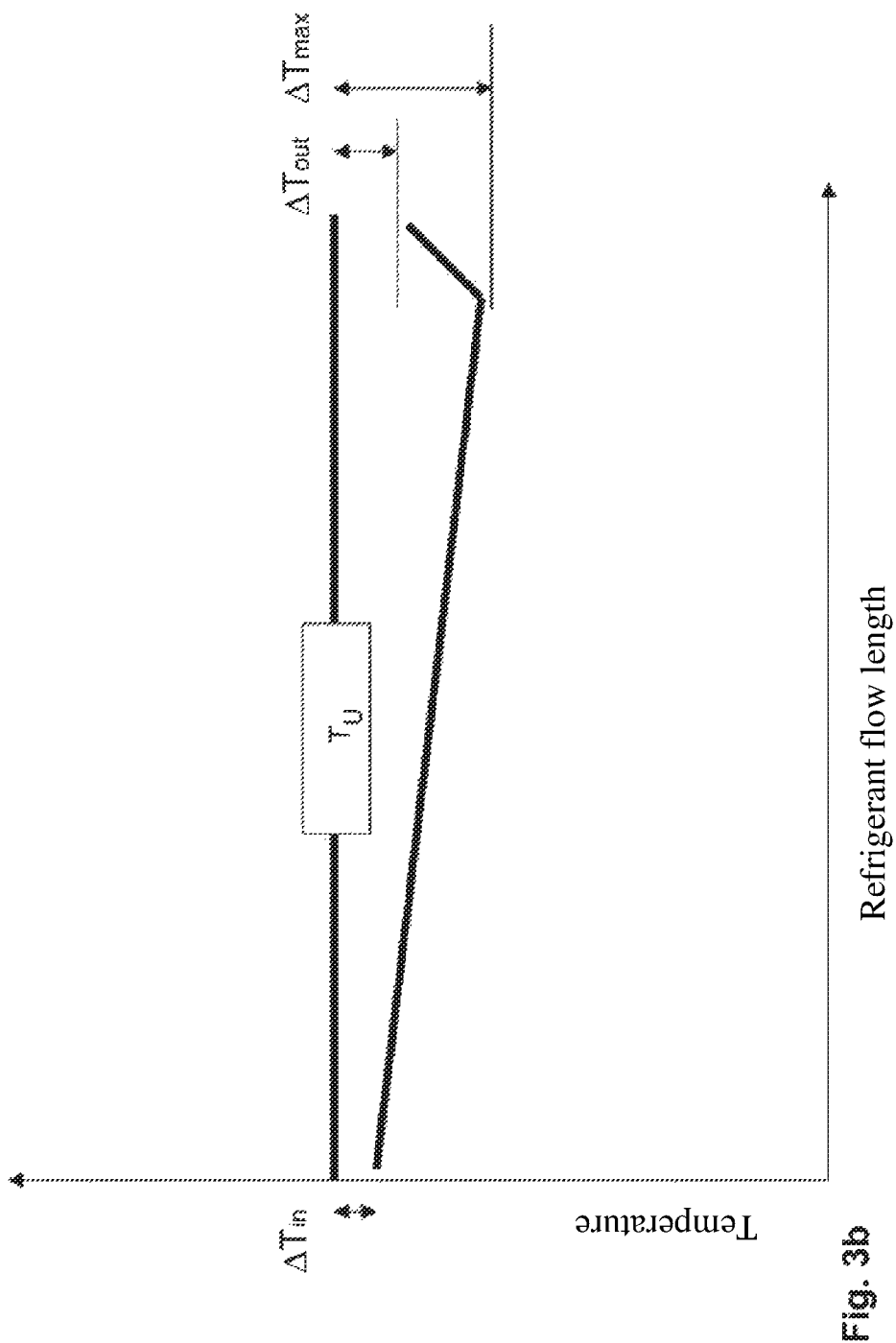
FIG. 3b shows a diagram with the temperature curve of the refrigerant over the flow length from the inlet to the outlet of the heat pump evaporator compared with air ambient temperature $T_U$ when the temperature is regulated.

According to the invention, the surface temperature level and the refrigerant temperature in the entire heat pump evaporator are adjusted to a predefined temperature level. The diagram from FIG. 3a shows a simplified, linearly decreasing temperature curve of the refrigerant over the refrigerant flow length from inlet to outlet of the heat pump evaporator having refrigerant temperatures below the ambient air temperature $T_U$ at a temperature difference $\Delta T_{in}$ at the inlet and a difference $\Delta T_{out}$ at the outlet. This temperature change is caused by the pressure drop on the refrigerant side in the 2-phase region. The diagram from FIG. 3b shows a temperature curve of the refrigerant when regulating the temperature with a changing rise over the refrigerant flow length from inlet to outlet of the heat pump evaporator, compared with ambient temperature $T_U$. In this example, the refrigerant is fully evaporated and superheated in the region of the temperature rise.

The refrigerant temperature $T_{in}$ at the inlet of the heat pump evaporator, as shown in FIGS. 3a and 3b, with a temperature difference $\Delta T_{in}$ of, for example, 1 K, lies slightly below the ambient air temperature $T_U$, respectively, below the air inlet temperature into the heat pump evaporator. The outlet temperature $T_{out}$ of the refrigerant is largely determined by the pressure drop and, therefore, the mass flow of the refrigerant. For this purpose, the compressor rotational speed of an electric refrigerant compressor or the regulating valve of a mechanical refrigerant compressor is regulated, such that the saturation pressure of the refrigerant associated with the outlet pressure exhibits a certain difference $\Delta T_{max}$ relative to ambient air temperature $T_U$, namely a difference between 2 to 10 K, preferably 2 to 5 K, as shown in FIG. 3b. In the case of a temperature curve, as is shown in FIG. 3b, the difference $\Delta T_{out}$ between the outlet temperature $T_{out}$ and the ambient air temperature $T_U$ is calculated based on the sum of difference $\Delta T_{max}$ and the superheating of the refrigerant.

Figure 4:
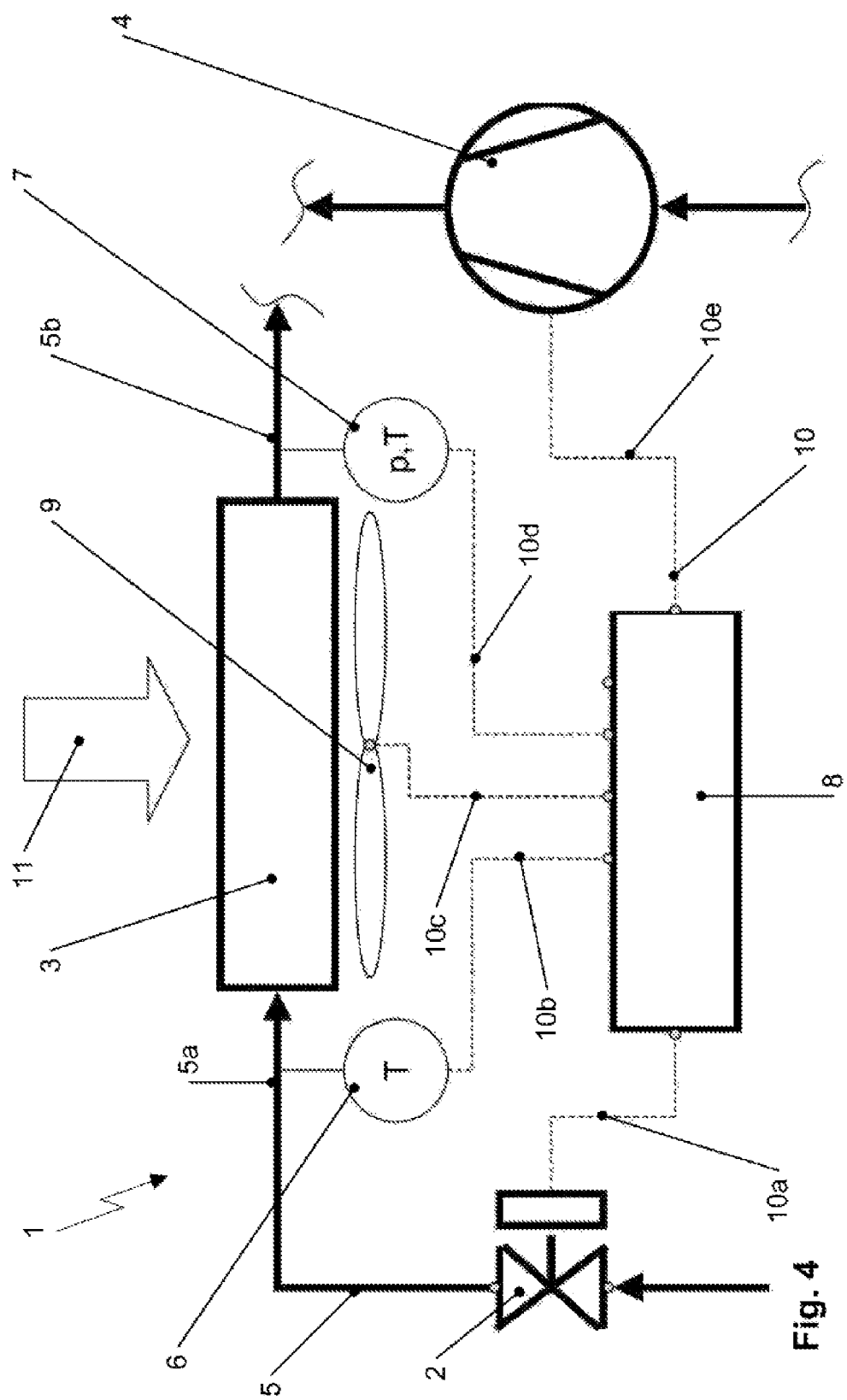
FIG. 4 shows a subsection of a refrigerant circuit including sensors and actuators for the air heat pump having pressure and temperature sensors upstream and downstream from the heat pump evaporator.

FIG. 4 shows a subsection 1 of a refrigerant circuit of an air conditioning system as a device for icing prevention regulation for a heat pump evaporator. The device 1 comprises a preferably externally regulatable expansion valve 2 having an air conditioning condenser 3 (AC condenser), which functions during heat pump operation as a heat pump evaporator 3 and is perfused during heat pump operation preferably counter to the air conditioning operating direction (AC operating direction) on the refrigerant side, a refrigerant compressor 4 and refrigerant lines 5 between expansion valve 2 and heat pump evaporator 3, and between heat pump evaporator 3 and refrigerant compressor 4. According to FIG. 4, a first temperature sensor 6 is arranged in or on a section 5a of the refrigerant line 5 upstream from the heat pump evaporator 3 and a combined pressure-temperature sensor 7 is arranged in a section 5b of the refrigerant line 5b downstream from heat pump evaporator 3, in each case relative to the heat pump operating direction. The measurement signals from the sensors, from the first temperature sensor 6 and the combined pressure-temperature sensor 7 are processed by a control and regulating unit 8, which, in addition to processing other sensors present in the vehicle, for example the ambient air temperature $T_U$, the vehicle speed $v_F$, etc., for the heat pump, actuates the cooler fan 9 of the vehicle shown in FIG. 4 and regulates directly or indirectly the flow cross-section of the expansion valve 2 and the rotational speed of an electric refrigerant compressor 4 or the regulator valve of a mechanical refrigerant compressor 4. Optionally, still other sensors may be used for determining the dew point or the condition of the ambient air such as, for example, rain sensor or an ambient moisture sensor. For this purpose, the control and regulating unit 8 is connected via at least one signal line 10, 10a to the external regulator of the expansion valve 2, via at least one signal line 10, 10b to the first temperature sensor 6, via at least one signal line 10, 10c to the cooler fan 9, via at least one signal line 10, 10d to the combined pressure-temperature sensor 7, and via at least one signal line 10, 10e to the refrigerant compressor or, respectively, a regulator for the refrigerant compressor 4.

The cooler fan 9 attached to the heat pump evaporator 3 draws ambient air 11 at an adjustable flow speed upstream from and through the heat pump evaporator 3, and thus permits a permanent flow of ambient air (11) over the heat pump evaporator surface. Unlike the pure air conditioning system operation (AC operation), the cooler fan 9 is also prompted at temperatures below 0° C. ambient air temperature $T_U$ by the air conditioning system (heat pump), preferably as a function of the travelling speed $v_F$. The expansion valve 2 is used to regulate the inlet temperature $T_{in}$ into the heat pump evaporator 3. In the process, the expansion valve 2 is closed far enough that the refrigerant temperature $T_{in}$ at the inlet of the heat pump evaporator 3 lies slightly, for example, 1 K, below the ambient air temperature $T_U$, respectively, below the air inlet temperature into the heat pump evaporator 3. If the expansion valve 2 is opened to wide, the inlet temperature $T_{in}$ rises above the ambient air temperature $T_U$ because of the pressure drop in the heat pump evaporator 3. In this case, a portion of the heat exchange surface is used not for evaporating, but, if necessary, even for condensing the refrigerant. As a result, the efficiency of the air heat pump is negatively impacted.

The outlet temperature of the refrigerant is determined largely by the pressure drop and, thus, the flow mass of the refrigerant. For this purpose, the compressor rotational speed of an electric refrigerant compressor 4 is regulated or, respectively, the regulating current of a regulator for a mechanical refrigerant compressor 4 is adjusted so that the saturation temperature of the refrigerant associated with the outlet pressure lies below the ambient air temperature $T_U$, and thereby maintains a certain difference relative to this ambient air temperature $T_U$ (preferably 5 to 10 K). In this case, the saturation temperature of the refrigerant is determined according to FIG. 4 based on the pressure signal p detected by the combined pressure-temperature sensor 7, with the aid of characteristic curves, polynomial functions stored in the control and regulating unit 8, or by access to libraries having detailed property data functions.

Figure 5:
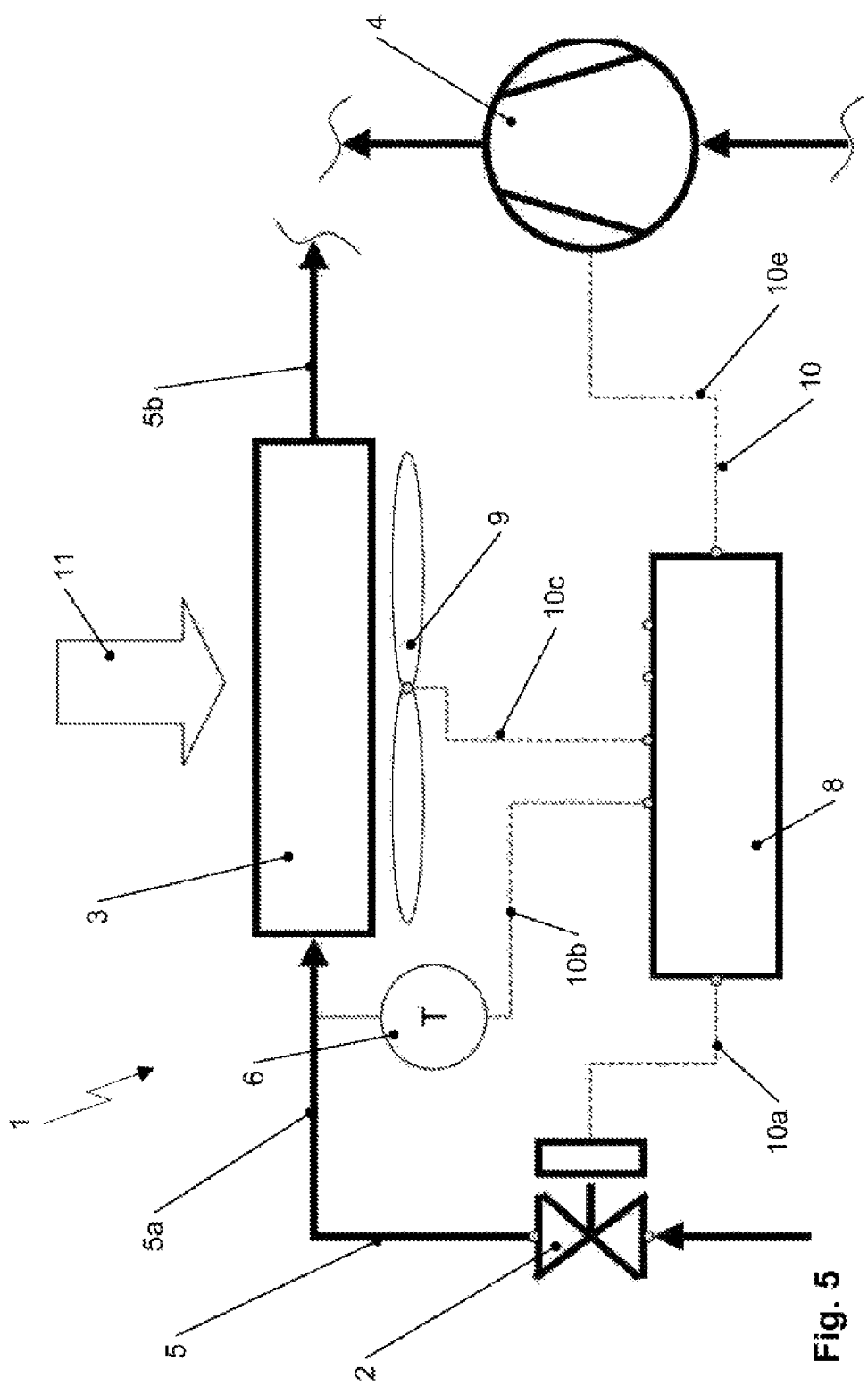
FIG. 5 shows a subsection of a refrigerant circuit including sensors and actuators for the air heat pump without pressure and temperature sensors downstream from the heat pump evaporator.

There is also the possibility of storing a pressure drop characteristics map for the heat pump evaporator 3 and to estimate the maximum possible compressor rotational speed or the maximum possible regulating current with the aid of the ambient air temperature $T_U$, below which the saturation temperature of the refrigerant associated with the outlet pressure lies, while maintaining a specific difference $\Delta T_{max}$ relative to this ambient air temperature $T_U$, namely of preferably 5 to 10 K. In this case, the potentially combined pressure and temperature sensors downstream from the heat pump evaporators 3 may be eliminated, as shown by the device 1 in FIG. 5. Thus, the device 1 for icing prevention regulation for a heat pump evaporator 3 according to the representation in FIG. 5 lacks, in contrast to FIG. 4, a pressure-temperature sensor 7 downstream from the heat pump evaporator 3, with respect to the heat pump operating direction, and a corresponding signal line 10d from the pressure-temperature sensor 7 to the control and regulating unit 8.

LIST OF REFERENCE NUMERALS

1 Device, subsection of a refrigerant circuit of an air conditioning system
2 Expansion valve
3 Heat pump evaporator, air conditioning system condenser, (AC-condenser)
4 Refrigerant compressor
5 Refrigerant line
5a Section of the refrigerant line (upstream from the heat pump evaporator 3)
5b Section of the refrigerant line (downstream from the heat pump evaporator 3)
6 (First) temperature sensor
7 (combined Pressure-temperature sensor
8 Control and regulating unit
9 Cooler fan
10 Signal lines
10a Signal line (between control and regulating unit 8 and expansion valve 2)
10b Signal line (between control and regulating unit 8 and (first) temperature sensor 6)
10c Signal line (between control and regulating unit 8 and cooler fan 9)
10d Signal line (between control and regulating unit 8 and pressure-temperature sensor 7)
10e) Signal line (between control and regulating unit 8 and refrigerant compressor 4)
11 Ambient air
$T_U$ Ambient air temperature
$T_{in}$ Inlet temperature (of the refrigerant in the heat pump evaporator 3), refrigerant temperature at the inlet into the heat pump evaporator 3
$T_{out}$ Outlet temperature (of the refrigerant exiting the heat pump evaporator 3)
$\Delta T_{in}$ Difference of the inlet temperature of the refrigerant entering the heat pump evaporator relative to the air ambient temperature $T_U$
$\Delta T_{out}$ Difference of the outlet temperature of the refrigerant relative to the environment
$\Delta T_{max}$ Difference of the saturation temperature of the refrigerant associated with the refrigerant at the outlet of the heat pump evaporator relative to the environment
$v_F$ Driving speed, vehicle speed
p Pressure, pressure signal
100 Heat pump (prior art)
110 Temperature sensor (in heat pump 100 according to the prior art)
120 Control unit (in heat pump 100 according to the prior art)
130 Expansion valve (in heat pump 100 according to the prior art)
140 Condenser (in heat pump 100 according to the prior art)
145 Heating circuit (in heat pump 100 according to the prior art)
150 Compressor (in heat pump 100 according to the prior art)
160 Fan (in heat pump 100 according to the prior art)
170 Evaporator (in heat pump 100 according to the prior art)
172 Side of the evaporator 170 (in heat pump 100 according to the prior art)
174 Side of the evaporator 170 (in heat pump 100 according to the prior art)
180 Ambient air
190 Refrigerant lines (in heat pump 100 according to the prior art)

480 Direction of the air flow (in heat pump 100 according to the prior art)

What is claimed is:

1. A device in an air conditioning system for a vehicle for regulation of a surface temperature level and icing prevention regulation for a heat pump evaporator, comprising:

the heat pump evaporator which functions during an air conditioning system operation in an air conditioning system operating direction as an air conditioning system condenser, an externally regulatable expansion valve for opening and closing, a refrigerant compressor, refrigerant lines between the externally regulatable expansion valve and the heat pump evaporator and between the heat pump evaporator and the refrigerant compressor, a cooler fan attached to the heat pump evaporator which draws ambient air upstream from and through the heat pump evaporator at an adjustable flow speed, and thereby permits a flow of the ambient air over a heat pump evaporator surface, a first temperature sensor arranged at the inlet of the heat pump evaporator, for detecting the refrigerant temperature upstream from the heat pump evaporator with respect to a heat pump operating direction, and a controller for storing a pressure drop characteristic map, the pressure drop characteristic map corresponding to a pressure drop of the heat pump evaporator, the pressure drop determining the Tout of the heat pump evaporator, the controller being directly connected to the externally regulatable expansion valve, the controller being connected to the externally regulatable expansion valve via signal lines, the controller being further connected at least to the first temperature sensor, additional sensors, measurement signal emitters or processing units with calculated values for detecting the ambient air temperature (Tu) and a vehicle speed (VF), the cooler fan, and the refrigerant compressor, wherein the heat pump evaporator operates counter to the air conditioning operation direction during icing prevention regulation;

wherein the heat pump function is continuously maintained at below 0° C. ambient air temperature;

wherein the controller is adapted to control the externally regulated expansion valve such that the inlet temperature of the refrigerant at an inlet of the heat pump evaporator lies below the ambient air temperature being below 0° C.;

wherein the controller is adapted to prompt the cooler fan at below 0° C. ambient air temperature;

wherein the device is a subsection of a refrigerant circuit operable both as a heat pump system and the air conditioning system, the heat pump system having a heat pump operating direction, the air conditioning system having the air conditioning system operating direction, the heat pump operating direction being opposing to the air conditioning system operating direction.

2. The device according to claim 1, further comprising an ambient moisture sensor for determining the ambient moisture and/or a rain sensor which detects rain or snow fall.

3. The device according to claim 1, wherein a pressure sensor is provided in order to regulate an outlet temperature ($T_{out}$) of the refrigerant from the heat pump evaporator, and a second sensor connected to the control and regulating unit via the another signal line is provided in the refrigerant line downstream from the outlet of the heat pump evaporator on the path to the refrigerant compressor, with respect to the heat pump operating direction.

4. The device according to claim 1, wherein potential pressure drops in the refrigerant line placed between the heat pump evaporator outlet and a pressure sensor for regulating the outlet temperature ($T_{out}$) of the refrigerant from the heat pump evaporator are stored per the pressure drop characteristic map in the control and regulating unit.

5. The device according to claim 1, wherein a maximum rotational speed of the compressor when using the electric refrigerant compressor, or a maximum control current of the regulating valve when using the mechanical refrigerant compressor being estimated with the aid of the ambient temperature ($T_U$).

6. The device according to claim 1, wherein the refrigerant compressor is an electrical or a mechanical compressor, and the signal lines connect the control and regulation unit to the refrigerant compressor if the electric refrigerant compressor is used or to a regulating valve of the mechanical refrigerant compressor if the mechanical refrigerant compressor is used.

7. The device according to claim 6, wherein the control and regulation unit has technical programming measures for regulation of a rotational speed of the electric refrigerant compressor or of the regulating valve of the mechanical refrigerant compressor.

8. The device according to claim 1, wherein a valve element of the externally regulatable expansion valve opens or closes a flow cross-section of the externally regulatable expansion valve, a regulating valve of the refrigerant compressor opens or closes the refrigerant compressor and a motor of the cooler fan adjusts a rotational speed of the cooler fan of the vehicle during heat pump operation.

* * * * *